March 20, 1945.  E. F. RAYMOND  2,372,009
WELDING ROD HOLDER
Filed April 27, 1943
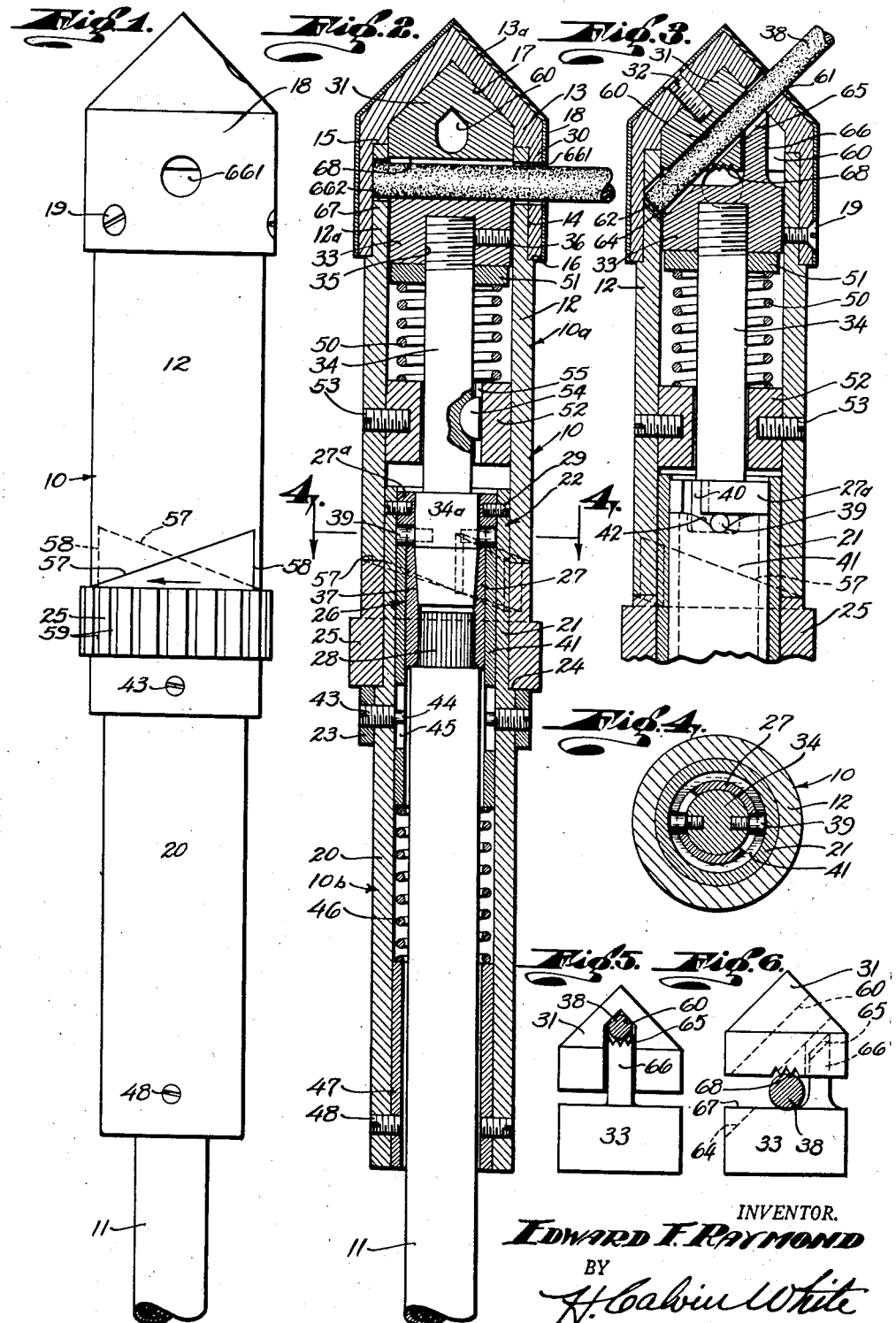
INVENTOR.
Edward F. Raymond
BY
H. Calvin White
ATTORNEY Patented Mar. 20, 1945

2,372,009

UNITED STATES PATENT OFFICE 2,372,009

WELDING ROD HOLDER

Edward F. Raymond, Los Angeles, Calif.

Application April 27, 1943, Serial No. 484,690

10 Claims. (Cl. 219—8)

This invention relates to improvements in welding rod holders, and has for its general purpose to provide various features with respect to the electrical insulating qualities as well as the mechanical aspects of the holder, that render it superior to the conventional forms of rod holders.

One major object of the invention is to depart from the conventional exposed jaw type holder by containing the jaws and all current conducting parts within an electrically insulated body, thus precluding any possibility of arcing between any of the holder parts and an outside conductor. In accordance with the preferred form of the invention, the body is made of tubular insulating material, closed at its outer end, so that the rod is inserted through an opening in the body into engagement with a releasable holding mechanism entirely contained within the body. While in the broad aspects of the invention, different forms of rod holding mechanisms may be used, it is preferred to employ a movable jaw operable by relative movements of sectional parts of the body. Accordingly, the body may be made to comprise relatively axially movable sections, whose relative movement in one direction opens the jaws against the thrust of a closing spring to receive and engage the welding rod.

Another object of the invention is to provide a closed body and jaw assembly permitting insertion and retention of the welding rod in different positions, according to the facility offered in a particular welding operation by reason of a particular angularity of the rod with respect to the holder body. As illustrative, the jaws may be adapted to retain the rod in a position at about right angles to the holder body, or in another position in which the rod is projected at an angle forwardly of the body.

A further feature of the invention is the provision of a body having an outer section containing the rod gripping jaw assembly, which is detachable from an inner section which receives the current supply conductor and contains a terminal connection with the jaw operating parts in the outer section. As will later appear this connection is made to have the combined features of a joint which normally is maintained in locked condition to prevent accidental loosening and current arcing within the holder, and which at the same time may be readily engaged and disengaged in connecting and disconnecting the body sections.

The invention has various other objects and details, but these, as well as the features mentioned in the foregoing, will be understood to better advantage from the following description of a typical and preferred embodiment of the invention, as illustrated in the accompanying drawing. In the drawing:

Fig. 1 is a side elevation of the holder;

Fig. 2 is a view showing the holder in longitudinal section, with the jaws engaging the rod in one of its positions;

Fig. 3 is a fragmentary section of the jaw end of the holder, with the rod engaged in another position;

Fig. 4 is a cross section on line 4—4 of Fig. 2; and

Figs. 5 and 6 are side elevations of the jaw assembly.

The holder may be regarded generally as having a tubular body 10 comprising relatively axially or longitudinally movable sections 10a and 10b, the former being farthest from the cable conductor 11 and therefore being referred to as the outer section, while 10b is referred to as the inner section. Body section 10a comprises a straight bore tube 12 closed at its outer end by a cap 13 having a counterbore 14 fitted to the reduced diameter end 12a of the tube 12, the cap being seated against shoulders 15 and 16, as illustrated. The cap 13 preferably is tapered at 13a toward its outer end, and although the form of the taper may be as desired, and may vary between a rounded and straight taper, it preferably has the angularity shown. The bore of the cap 13 likewise is tapered at 17 in substantial conformity with the outer surface thereof. In order to protect the holder body against injury by dropping or otherwise striking the holder on its outer end, and also to provide a wear-resistant surface, a metallic sheath 18, made for example of stainless steel, is applied to the cap 13, and the body section 12, cap and sheath are detachably interconnected by screws 19.

The inner body section 10b comprises a straight bore tube 20 having a reduced diameter end portion 21 received at 22 within the end of the outer body section 10a. Tube 20 carries a ring 23 forming with shoulder 24 a support for a rotatable cam sleeve 25, the purpose of which will later appear. The flexible, electrically insulated conductor 11 extends into the body section 10b to a fixed terminal, generally indicated at 26, and consisting of a metallic socket 27 within the inner end of which the end 28 of the conductor is welded, swaged or otherwise secured. The socket is releasably secured within the tube 20 by screws 29 threaded into the outer flange end 27a of the socket.

The body sections 10a and 10b, and including the tube 12, cap 13, cam sleeve 25, tube 20 and ring 23, all are made of electric insulating material, preferably of a composition adapted to withstand fairly high temperatures and capable of being molded or machined to their various shapes. As illustrative, these parts may be made of materials sold under the trade name "Formica," or of any of various temperature resistant plastic compositions. All the current conducting and rod engaging parts of the holder thus are completely enclosed and electrically insulated within the body of the holder, precluding the possibility of arcing between the body, or any of its contained metal parts, with an extraneous conductor, other than by way of the welding rod.

The outer end of the body contains a jaw assembly 30 comprising an outer jaw 31 removably held in seated position within the cap 13 by screw 32, and an inner jaw 33 capable of movement relative to the outer jaw section 10a. Electric current is supplied to the jaw 33 by a conductor rod 34 threaded at 35 into the jaw and retained therein by set screw 36. The conductor rod 34 is releasably connected with the cable socket 27 by insertion of the enlarged inner end 34a of the rod within the socket, the parts being engaged along tapered surfaces 37 to assure a snug fit. Current thus flows from the conductor 11 through the socket 27 and rod 34 to the jaw 33, and to the welding rod 38 engaged between the jaws.

The head 34a of the conductor rod is releasably held within the conductor socket by a pin-and-slot type connection comprising a pair of pins 39 projecting from the head 34a and received within bayonet slots 40 in the wall of the socket 27, the pins being inserted downwardly within and then turned in the slots, as illustrated in Fig. 3. To preclude the possibility of loosening or breaking the connection between the socket and the conductor rod while current is fed into the holder, I preferably utilize an auxiliary locking device to retain the pins 39 fully engaged within the slots 40. The locking device comprises a sleeve 41 made of the insulating material and displaceable axially of the body within the space between the tube 20 and the socket 27. The outer end of the sleeve has a pair of recesses 42 to receive the pins 39 in the locked position of Fig. 3, and is held against turning within the body by screws 43, the ends 44 of which project into narrow slots 45 in the sleeve. The positions of recesses 42 thus are predetermined with relation to the locked positions of the pins 39. Screws 43 may also serve to hold the ring 23 in position. The sleeve 41 is thrust outwardly by a coil spring 46 confined between the inner end of the sleeve and a liner 47 held by screws 48 within the inner end of tube 20.

In making up the joint, pins 39 are thrust in the slots 40 into engagement with the end of the sleeve 41, and pressed further to displace the sleeve against the resistance of spring 46. As the pins are turned into the transverse runs of the slots, they are brought into the sleeve recesses 42 and the sleeve moves by return thrust of the spring to hold the pins in locked position. The angularities of the recesses 42 are such that the pins may be turned out of the slots when it is desired to disconnect the parts. The joint may be disconnected by turning (clockwise) the entire body section 10a relative to section 10b, thus permitting detachment as a unit, of the tube 12 and the conductor rod and jaw assembly.

Jaw 33 is urged into the engagement with jaw 31 by coil spring 50 confined between washer 51 and ring 52 secured within the body by screw 53. The rod 34 carries a spline 54 movable within the ring way 55 to prevent turning of the rod and connected jaw within the body. Movement apart of the jaws 31 and 33 to accommodate the rod 38, is effected by axial movement of the body section 10a relative to the rod 34 and jaw 33. Such movement may be caused by the use of the rotating sleeve 25 engaged with the inner end of the tube 12 along the cam surfaces 57. Rotation of the sleeve 25 in the direction of the arrow indicated in Fig. 1 displaces the outer body section 10a and ring 52 against the resistance of spring 50, spreading the jaws to permit insertion of the rod 38. Rotation of the cam sleeve in a reverse direction is limited by the engagement of the sleeve and jaw shoulders along the lines 58. The enlarged diameter portion of the sleeve 25 may be provided with flutings 59 or other surface irregularities to facilitate its turning by the operator.

As best illustrated in Figs. 5 and 6, the jaws 31 and 33 are specially shaped and adapted to accommodate the rod 38 in two positions of angularity relative to the body. Jaw 31 contains an angularly extending opening 60, which receives the rod shown in the position of Fig. 3 to be inserted through, and with clearance from the body opening 61, the inner end of the rod being received within a cavity 62 in the wall of tube 12. The angularity of the opening 60 is such that the rod extends at an angle of about 45° with the longitudinal axis of the holder. The rod is held within the V-shaped base of opening 60 by engagement of the inner end of the rod within recess 64 in the jaw 33, and further through engagement by the toothed end 65 of tongue 66 projecting from jaw 33 outwardly within the opening 60.

Referring now to Figs. 2 and 6, it will be observed that the jaws 31 and 33 have a second pair of rod engaging surfaces between which the rod is received when inserted, with clearance, through the body opening 661, the inner end of the rod being received within cavity 662. Here the rod is pressed by the engaging end surface 67 of jaw 33 against the toothed surface 68 of jaw 31. The inserted rod is held between these jaws surfaces in a position substantially at right angles with the body axis.

In assembling the holder, the body section 10b may be made up to receive the conductor cable 11, the locking sleeve 41 and the socket 27 affixed to the end of the cable and secured within the body section as described. After application of the cam sleeve 25, the assembled outer body section 10a, containing the jaws and conductor rod 34 is applied to the inner section by turning the pins 39 into and locking them within the slot 40.

Then by rotation of the cam sleeve 25, the jaws are opened to receive the welding rod in either of the positions shown and described. For certain welding operations, the operator finds it more convenient to carry the rod at an angle giving it a forward projection beyond the end of the holder, in which event the rod is inserted in the position of Fig. 3. In other instances the work is facilitated by extending the rod at about right angles with the body axis, in which event the rod is inserted in the position of Fig. 2.

I claim:

1. A welding rod holder comprising a tubular body, said body including a pair of relatively axially movable sections, a conductor extending into the body, rod holding means within the body receiving current from said conductor and adapted to releasably retain a welding rod inserted through an opening in the body, a member rotatable about the body to produce relative axial movement of said body sections for releasably engaging said holding means with the rod, and a spring resisting such relative axial movement of said sections.

2. A welding rod holder comprising a tubular body enclosed at its outer end and made of electrical insulating material, said body including a pair of relatively axially movable tubular sections, a conductor extending into the body, rod holding means within the body receiving current from said conductor and adapted to releasably retain a welding rod inserted through an opening in the body, means operable by relative axial movement of said body sections for releasably engaging said holding means with the rod, and yielding means resisting such relative movement of the body sections.

3. A welding rod holder comprising a tubular body, a jaw enclosed within the outer end portion of the body and adapted to releasably engage a welding rod inserted through an opening in the body, an electrical conductor extending into the inner end of the body, a conductor rod attached to said jaw and carrying current thereto from said electrical conductor, and means comprising a sleeve rotatable about the body for producing relative longitudinal movement between said conductor rod and the body to releasably engage said jaw with the welding rod.

4. A welding rod holder comprising a body including a pair of axially alined inner and outer relatively longitudinally movable sections, a jaw within the outer portion of the body and adapted to releasably engage a welding rod inserted through an opening in the body, a conductor rod attached to the jaw and extending longitudinally within the body, and means comprising a sleeve rotatable about the body to produce relative longitudinal movement of said body sections for releasably engaging said welding rod with the jaw.

5. A welding rod holder comprising a body including a pair of axially alined inner and outer relatively longitudinally movable sections, said body being made of electrical insulating material and being closed at its outer end, a jaw within the outer portion of the body and adapted to releasably engage a welding rod inserted through an opening in the body, a conductor rod attached to the jaw and extending longitudinally within the body, means operable by relative longitudinal movement of said body sections for releasably engaging said welding rod with the jaw, and a rotatable cam sleeve on the body for producing such relative longitudinal movement of the body sections.

6. A welding rod holder comprising a body including a pair of axially alined inner and outer relatively longitudinally movable sections, a jaw within the outer portion of the body and adapted to releasably engage a welding rod inserted through an opening in the body, a conductor rod attached to the jaw and extending longitudinally within the body to a fixed position in said inner section, means comprising a sleeve rotatable about the body for moving said outer body section relative to the inner section to receive the welding rod between said jaw and the end of the outer body section, and a spring placed about said conductor rod and resisting said movement of the outer body section relative to the inner section.

7. A welding rod holder comprising a body including a pair of axially alined inner and outer relatively longitudinally movable sections, a jaw within the outer portion of the body and adapted to releasably engage a welding rod inserted through an opening in the body, a conductor rod attached to the jaw and extending longitudinally within the body to a fixed position in said inner section, a second jaw fixed to the inside end of said outer section, and means comprising a sleeve rotatable about the body for moving said body sections relatively to releasably engage the welding rod between said jaws.

8. A welding rod holder comprising a body including a pair of axially alined inner and outer relatively longitudinally movable sections, said body being made of electrical insulating material and being closed at its outer end, a jaw within the outer portion of the body and adapted to releasably engage a welding rod inserted through an opening in the body, a conductor rod attached to the jaw and extending longitudinally within the body to a fixed position in said inner section, a second jaw fixed to the inside end of said outer section, said jaws having double sets of rod engaging surfaces to hold at different angles a rod inserted through either of a pair of openings in the body, and means comprising a sleeve rotatable about the body for moving said body sections relatively to releasably engage the welding rod between said jaws.

9. A welding rod holder comprising a body including a pair of axially alined inner and outer relatively longitudinally movable sections, said body being made of electrical insulating material and being closed at its outer end, a jaw within the outer portion of the body and adapted to releasably engage a welding rod inserted through an opening in the body, a conductor rod attached to the jaw and extending longitudinally within the body to a fixed position in said inner section, a second jaw fixed to the inside end of said outer section, a rotatable cam sleeve on the body for moving said outer body section relative to the inner body section to permit insertion of the welding rod between said jaws, and a spring resisting such relative movement of the body sections.

10. A welding rod holder comprising a body including a pair of axially alined inner and outer relatively longitudinally movable sections, said body being made of electrical insulating material and being closed at its outer end, a jaw within the outer portion of the body and adapted to releasably engage a welding rod inserted through an opening in the body, a conductor rod attached to the jaw and extending longitudinally within the body to a fixed position in said inner section, a second jaw fixed to the inside end of said outer section, a rotatable cam sleeve on the body for moving said outer body section relative to the inner body section to permit insertion of the welding rod between said jaws, a spring resisting such relative movement of the body sections, an electrical conductor extending into the inner end of the body, and a releasable connection between said conductor and said conductor rod.

EDWARD F. RAYMOND.